UNITED STATES PATENT OFFICE.

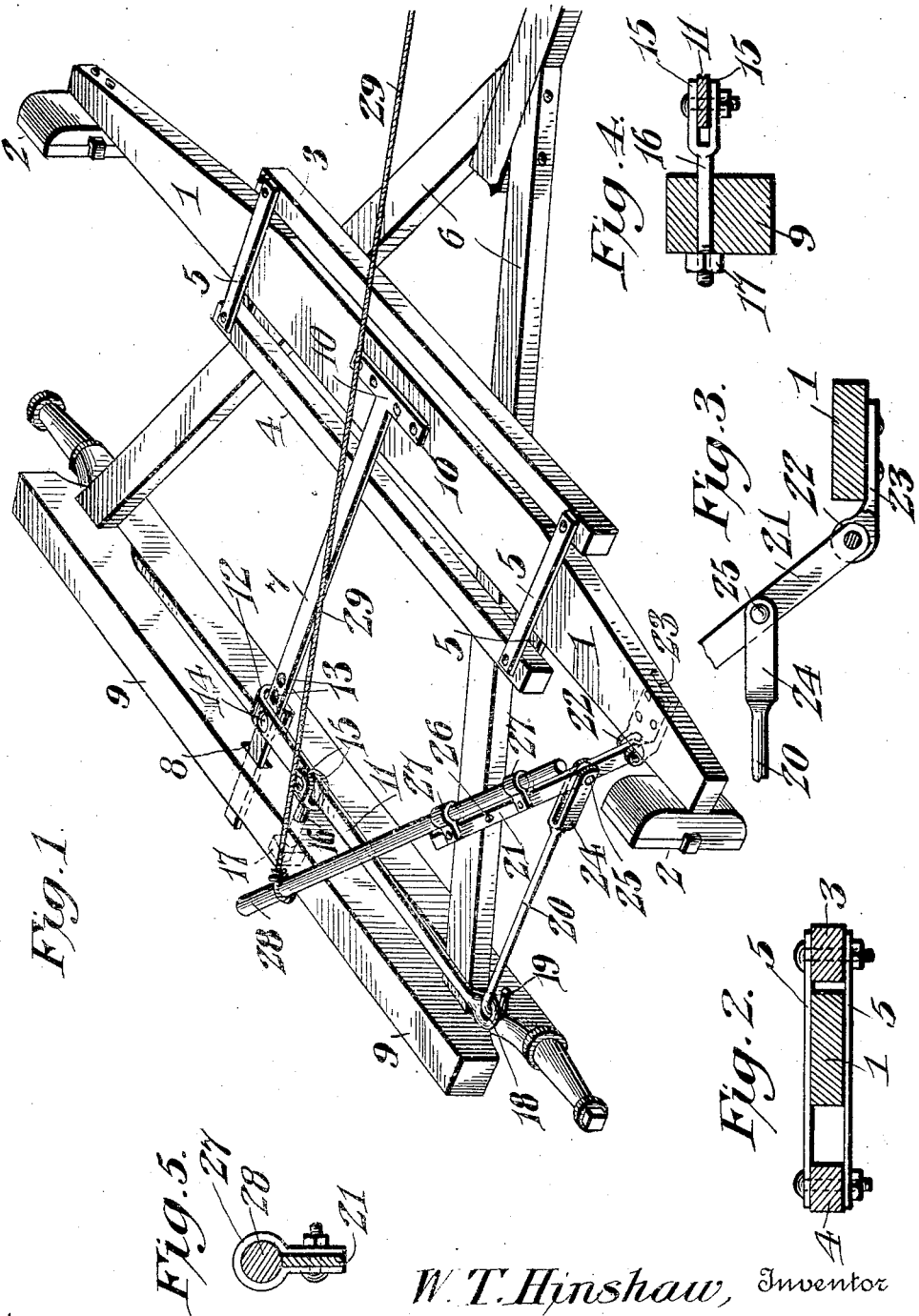

WILLIAM T. HINSHAW, OF VALLEY STATION, KENTUCKY.

VEHICLE-BRAKE.

941,876. Specification of Letters Patent. Patented Nov. 30, 1909.

Application filed December 18, 1908. Serial No. 468,195.

*To all whom it may concern:*

Be it known that I, WILLIAM T. HINSHAW, a citizen of the United States, residing at Valley Station, in the county of Jefferson and State of Kentucky, have invented a new and useful Vehicle-Brake, of which the following is a specification.

The invention relates to improvements in vehicle brakes.

The object of the present invention is to improve the construction of vehicle brakes, and to provide a simple and inexpensive vehicle brake, which, while capable of use on various kinds of vehicles, will be especially advantageous for heavy hauling in mountainous districts, where an easy application of great power is necessary to control a loaded vehicle.

A further object of the invention is to provide a vehicle brake of this character, adapted to be conveniently connected with the brake operating mechanism of a vehicle body, and capable also of being conveniently operated from the top of a load, or from one of the horses of a team, so that the same person may do both the driving and the braking.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a perspective view of a vehicle brake, constructed in accordance with this invention and shown applied to a portion of a running gear. Fig. 2 is a detail sectional view of the guide frame. Fig. 3 is a detail sectional view, illustrating the manner of mounting the operating lever. Fig. 4 is a detail view, illustrating the construction of the support for the transverse lever. Fig. 5 is a detail sectional view of the operating lever.

Like numerals of reference designate corresponding parts in all the figures of the drawing.

1 designates a brake beam, equipped at its ends with suitable brake shoes 2, and operating in a guide frame composed of front and rear transverse bars 3 and 4 and upper and lower terminal connecting bars 5, secured at their ends to the upper and lower faces to the transverse bars 3 and 4 at the ends thereof. The transverse bars 3 and 4 are spaced apart and the intermediate portion of the brake beam is arranged between the transverse bars, and is movable backwardly and forwardly in such space, being guided in its backward and forward movement. The guide frame besides operating to guide the transverse brake beam also serves as a stay or bracing frame for the rear hounds 6 of the running gear, which is thereby strengthened by the brake mechanism. The brake beam is also guided in its backward and forward movement by a longitudinal connecting bar 7, extending rearwardly from the brake beam and having its rear portion guided in a central opening 8 of the rear bolster 9 of the running gear. The bar 7, which extends through the rear bolster 9, is provided at its front end with a head 10 consisting of laterally extending arms and rigidly secured to the brake beam by bolts, or other suitable fastening devices.

The central longitudinal bar 7 is connected at a point between its ends with a transverse lever 11, located at the front side of the rear bolster 9 and extending from the center thereof to one side of the vehicle. The inner end 12 of the transverse lever is bent on itself and extends beneath the longitudinal bar 7, which is provided with a plurality of perforations 13 for the reception of the pivot bolt 14 for connecting the inner end of the transverse lever with the longitudinal connecting bar. The transverse lever is fulcrumed in a bifurcated head 15 of the bolt 16, piercing the rear bolster and forming a support for the transverse lever. The bolt 16 is equipped at its rear end with a nut 17, which engages the rear face of the bolster 9, but any other suitable means may be employed for mounting the transverse lever on the running gear. When the transverse lever is oscillated, the longitudinal bar 7, which is connected with the brake beam, will be reciprocated.

The outer end of the transverse lever is provided with an eye 18, which is engaged by a hook 19 of a rod 20, and the latter extends forwardly from the transverse lever and is connected with an operating lever 21. The operating lever 21, which extends upwardly from the brake beam, is pivoted at its lower end in a bifurcation 22 of a plate 23, secured to the lower face of the brake beam and extending rearwardly therefrom. The front portion 24 of the rod 20 is forked or bifurcated to receive the lever 21, and is pivoted to the same by a bolt 25, which pierces the lever 21 near the lower portion thereof. The hook 19 will enable the rod 20 to be readily disconnected from the transverse lever 11, when it is desired to connect the rod of a wagon bed lever with the brake mechanism.

The lever 21, which is located at one side of the vehicle, is provided with a perforation 26, adapted to receive a bolt for connecting the lever of the brake operating mechanism with the vehicle body. The lever 21 is also equipped with a pair of cuffs 27, adapted to receive a pole or bar 28 to which a rope 29, or other suitable flexible connection is attached. The rope 29 is designed to extend to the top of a load, or to one of the horses of a team, so that one man may do both the driving and the braking.

The transverse levers are adapted to enable the brake to be applied with great force, and the brake may be controlled from the back of one of the horses of the team with little effort. While the brake is applicable to various forms of vehicles, it is especially advantageous for heavy hauling in mountainous districts where great force is necessary in order to control a loaded vehicle.

Having thus fully described my invention, what I claim as new and desire to secure by Letters Patent, is:—

In a vehicle brake, the combination with a running gear provided in its rear bolster with a guide opening, of a guide frame secured to and extending across the rear hounds, a brake beam slidable in the guide frame, a longitudinal bar passing through the guide opening of the rear bolster and having its front end rigidly secured to the brake beam, a horizontal transverse lever fulcrumed between its ends on the running gear and connected at its inner end with the longitudinal bar, a support secured to the brake beam and extending rearwardly from the same at one side of the vehicle, a lever fulcrumed at its lower end to the support, and means located at an intermediate point between the ends of the lever for connecting the latter with the outer arm of the transverse lever.

In testimony, that I claim the foregoing as my own, I have hereto affixed my signature in the presence of two witnesses.

WILLIAM T. HINSHAW.

Witnesses:
DANIEL J. BRAND,
W. D. MORGAN.